Sept. 10, 1968  A. C. J. R. DE BERNARD DU GRAIL  3,400,726
APPARATUS FOR TREATING OF BIOLOGICAL PREPARATIONS
Filed July 26, 1966  3 Sheets-Sheet 1
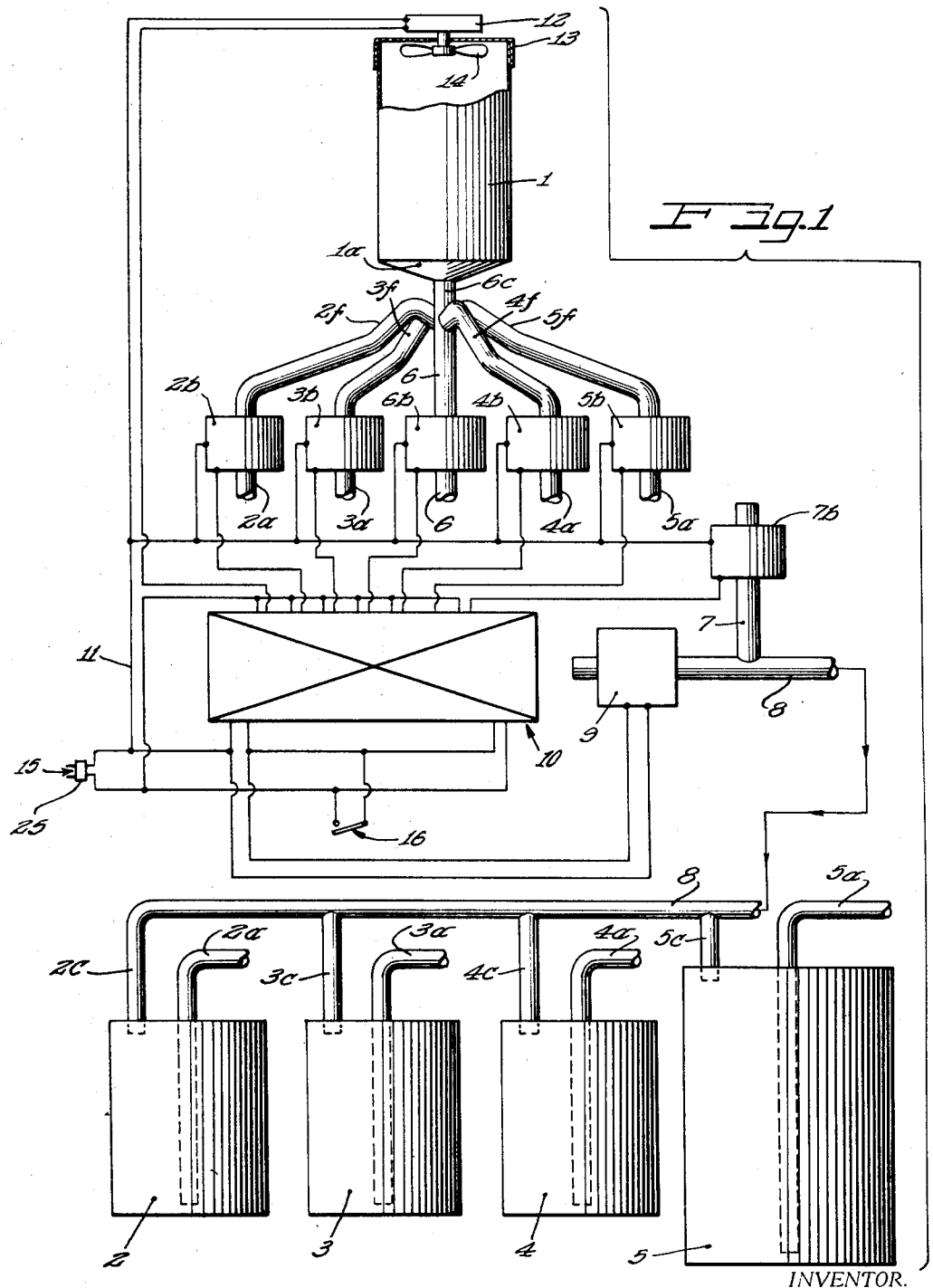
INVENTOR.
Alain C.J.R. de Bernard du Grail
ATTORNEYS Sept. 10, 1968  A. C. J. R. DE BERNARD DU GRAIL  3,400,726
APPARATUS FOR TREATING OF BIOLOGICAL PREPARATIONS
Filed July 26, 1966                    3 Sheets-Sheet 2
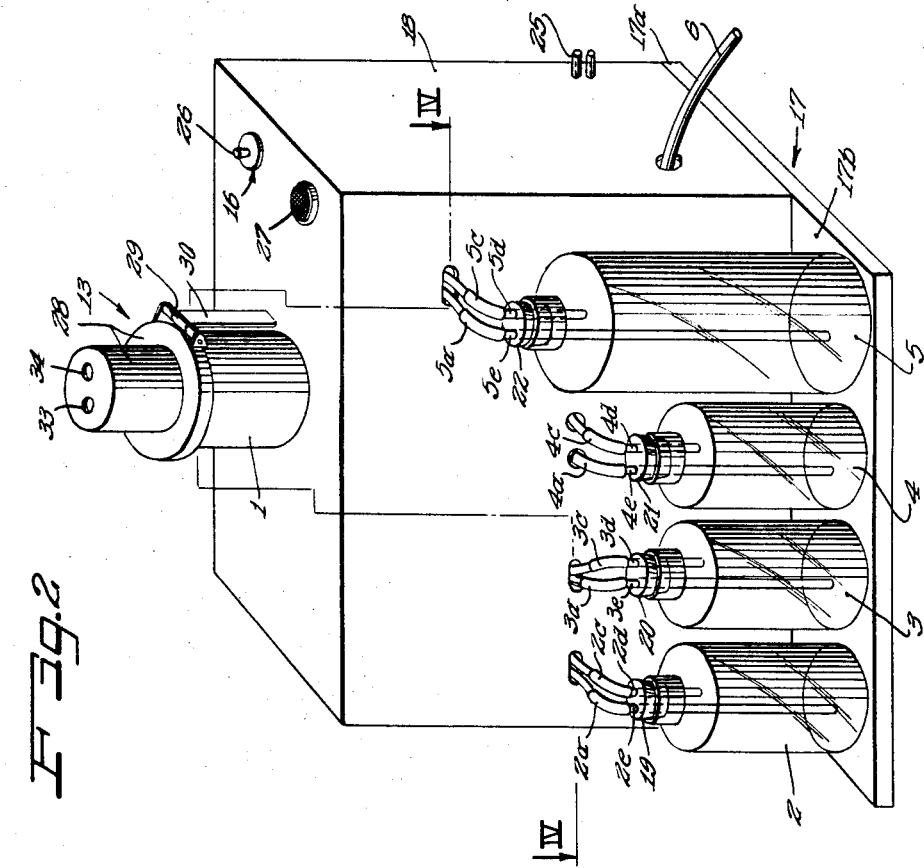
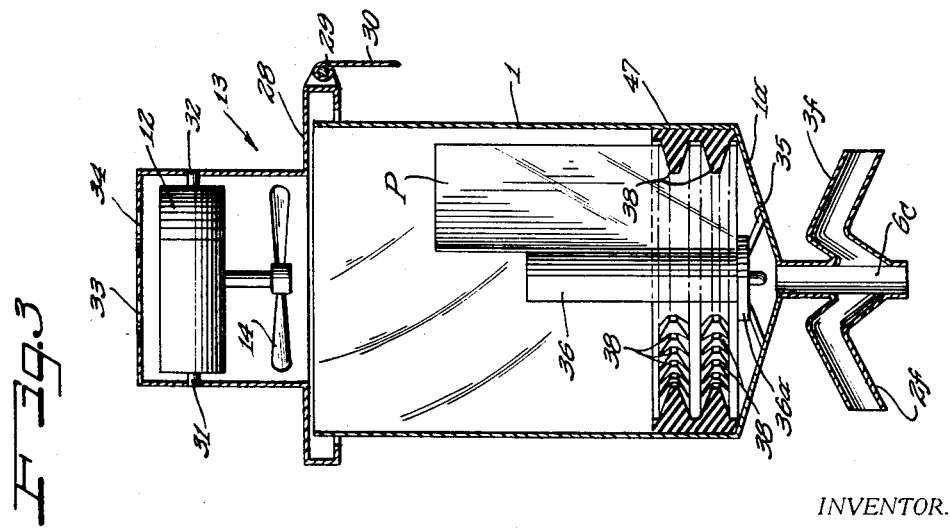
INVENTOR.
Alain C.J.R. de Bernard du Grail
BY Hill, Sherman, Meroni, Gross & Simpson  ATTORNEYS

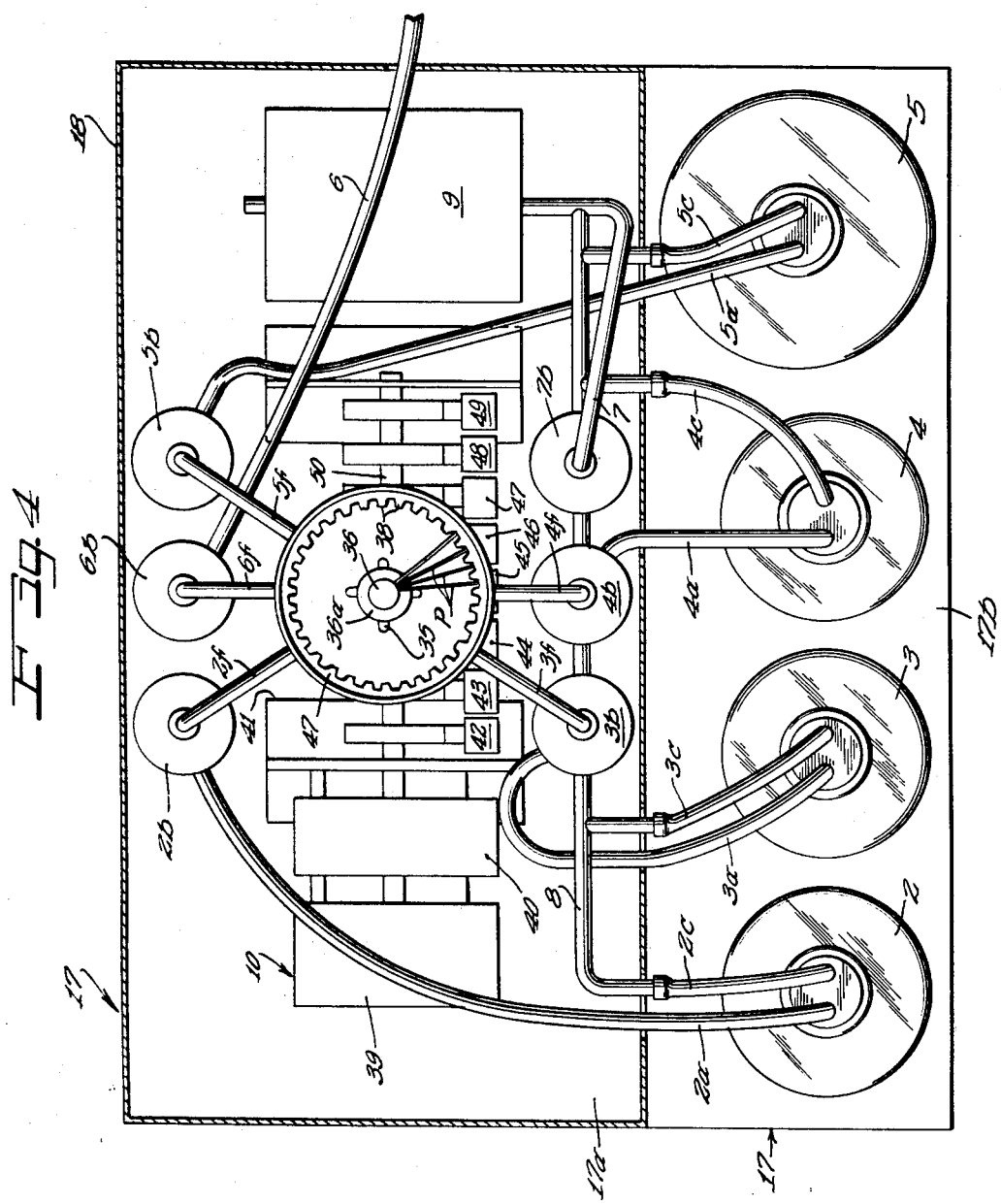

3,400,726
APPARATUS FOR TREATING OF
BIOLOGICAL PREPARATIONS
Alain C. J. R. de Bernard du Grail, Viroflay, France, assignor to AB Lars Ljungberg & Co., Stockholm, Sweden, a corporation of Sweden
Filed July 26, 1966, Ser. No. 568,052
Claims priority, application France, July 27, 1965, 26,152
3 Claims. (Cl. 134—95)

ABSTRACT OF THE DISCLOSURE

Apparatus for treating of biological preparations includes a vat structure comprising an upright container having a bottom wall and an open top, means for supporting specimen-carrying glass plates in the container, means for introducing and discharging treating fluid and a cover for the open top. A central pillar in the container cooperates with vertically spaced annular rows of teeth providing slots on the inside of the container to receive plates vertically and radially. A fan is mounted on the top for drying the treated plates.

---

This invention relates to a device for colouring of biological specimens, such as washes or smears made on glass slides.

The present invention has for an object a device making it possible to colour, with a dye or a succession of dyes, a plurality of biological specimens.

In biology, it is often required to examine under the microscope, washes or smears made on glass slides. For the sake of brevity such glass slides will hereinafter be shortly referred to as "samples." These washes or smears must very often be coloured, with a view to their examination. The dyeing techniques generally require the use of a certain number of colouring liquids or reagents, not only in a predetermined order, but also in such a manner that each of the liquids acts during a definite period, and the means for the employment of these colouring techniques must be suited to a strict carrying out of such a programme.

The device generally used for this purpose is of a simple structure, and the method of operation is as follows: the glass slides with the samples are laid flat at the bottom of vats and are covered in turn by each of the colouring liquids envisaged. Alternatively, the slides are immersed successively in each of the required dyestuffs.

An improved device of this kind is known and comprises a pivotable arm at the end of which there is arranged a basket containing a number of glass slides. This basket is arranged in such a manner as to enter successively the various liquids contained in stationary vats located at an equal distance from the axis of the aforesaid pivotable arm.

The hitherto known devices suffer from the drawback that they require a considerable skill on the part of the operator, even in the second type of device mentioned above. Furthermore, in the latter device the displacement of the slide holder or of the containers containing the colouring liquids, is attended by expenditure of energy, by the risk of loss of colouring liquids and by a progressive wear of the moving parts.

The present invention aims at obviating the foregoing disadvantages and at providing a device which operates automatically.

To this end the present invention comprises an apparatus for treating biological specimens, for example dyeing or rinsing of samples as hereinbefore defined, comprising a stationary vat provided with means for supporting said samples, a plurality of stationary tanks each adapted to receive a quantity of a dyeing or rinsing liquid, said liquids being adapted to be introduced in succession into said vat, and hydraulic and/or pneumatic means for introducing a predetermined quantity of said colouring or rinsing liquids into said vat and for emptying thereof.

The present invention makes it possible to carry out very quickly the dyeing of a large number of glass slides, which is of particular interest when such colorations are carried out with a view to a particular analysis, very often carried out by a specific laboratory. It is, for example the case when it is a question of establishing the leucocytic formula of the blood, which consists in differentiating the various kinds of white corpuscles from samples of suitably coloured blood. Such an analysis is carried out very frequently and requires the use of three dyestuffs according to a predetermined programme with which the operator, when using the device in accordance with the invention, no longer has to concern himself, when the device has been adjusted or set to carry out the required programme in an entirely automatic manner.

The device in accordance with the invention makes it possible to employ in entirely automatic manner, all types of dyeing techniques.

Advantageously, each of the tanks for the colouring liquids is connected to the vat by means of a duct fitted with an electrically operated valve, said duct allowing the passage of the respective colouring liquids, successively, from the corresponding container towards the vat, then from vat towards the container. The aforesaid hydraulic and/or pneumatic means possess in that case a structure which depends essentially upon the levels of the vat and of the tanks and they may comprise means for putting the various colouring liquids under pressure, means for putting them under vacuum, in association with means for eliminating said vacuum or interrupting said placing under pressure, these means putting in operation, for example, a suitable valve.

Preferably all the valves are operated in entirely automatic manner by means of a combining or programming device adjusted such as to introduce, then remove, in a predetermined sequence the various colouring or rinsing liquids in the vat.

According to a feature of the present invention, the aforesaid programming device is of the type having cams controlling switches, the said cams being operated by a synchronous motor fitted with a reduction gearing.

In accordance with another feature of the present invention, the stationary single vat is a container with transparent walls, substantially of cylindrical shape, with means of bracing the samples, the said means comprising a circular band arranged on the internal periphery of the said container and provided with teeth, and a coaxial pillar arranged in such manner that said samples can be placed, in vertical position, radially between the said pillar and the said band, each sample being engaged in a hollow between two consecutive teeth of the band.

In accordance with another feature of the invention, the single vat is provided with means for drying the samples, the drying means preferably consisting of an electric motor driving an air turbine.

In accordance with a further feature of the invention, the vat is provided with a pivoting non-tight cover and, according to a particularly advantageous embodiment, the electric motor and the air turbine are carried inside the said cover which has orifices for sucking in atmospheric air.

In order that the invention may be more readily understood, reference is made to the accompanying drawings which illustrate diagrammatically and by way of example, one embodiment thereof, and in which:

FIGURE 1 shows a block diagram of a device in accordance with the present invention, FIGURE 2 is a perspective view of a device for the colouring of biological media, FIGURE 3 is an enlarged view in longitudinal section of the single vat of the device of FIGURE 2, and FIGURE 4 is a sectional view on the line IV—IV of FIGURE 2.

Referring to the drawings, FIGURE 1 shows a fixed single vat 1 adapted to contain samples carrying the biological specimens to be coloured and tanks 2, 3 and 4 adapted to contain colouring liquids, while tank 5 is adapted to contain water for rinsing the samples when it is desired to pass from one dyeing liquid to another. The tanks 2, 3, 4 and 5 are connected by means of respective ducts 2a, 3a, 4a and 5a, provided respectively with electrically operated valves 2b, 3b, 4b and 5b, to the lower central part of the vat 1.

A drain pipe 6, provided with an electrically operated valve 6b, opens out, for example, above a sink (not shown).

Ducts 2c, 3c, 4c and 5c are respectively mounted on the containers 2, 3, 4 and 5 and are connected to a common duct 8 from which a duct 7 branches off issuing into the atmosphere and having an electrically operated valve 7b. The common duct 8 has in addition a pump 9.

Reference numeral 10 denotes a programming device while the lines 11 represent the electrical diagram of the device, the entirely automatic operation of which is ensured by the device 10 which controls the various valves 2b, 3b, 4b, 5b, 6b and 7b, the pump 9 as well as a motor 12 mounted on a pivotable cover 13 of the vat 1.

The motor 12 operates an air fan 14 permitting the drying of the samples after the rinsing water has been emptied from vat 1. The supply of electric energy to the device is effected via an electric plug 15 connected to the mains, the starting of the desired programme of the device 10 being effected by closure of an electric contact 16.

So as to explain now the operation of the device of the invention it will be assumed that vat 1 is at a higher level than that of all the tanks 2, 3, 4 and 5, assumed to be on the same plane and that pump 9 is a pressurizing pump. It will also be assumed that the dyeing liquids of tanks 2, 3 and 4 must be used in that order and that a rinsing has become necessary after dyeing by the colouring liquid of tank 4.

Initially, all the valves are closed. When the operator closes the contact 16, pump 9 is started and the valve 2b opens. Pump 9 thus creates a pressure above the level of the colouring liquid contained in tank 2, which pressure forces said liquid through the duct 2a and the valve 2b into vat 1. The valve 2b closes automatically after the time required for colouring by the reagent in tank 2 has elapsed, and at the same time the valve 7b opens. The opening of valve 7b depressurizes the container 2 and when valve 2b subsequently opens, the liquid contents of the vat 1 and the duct 2a are discharged into the tank 2. The valve 7b then closes and simultaneously the valve 3b opens, which permits the introduction of the colouring liquid from tank 3 into vat 1 through the duct 3a and the valve 3b. Upon closure of the valve 3b in a manner similar to that of valve 2b, valve 7b opens again, and on subsequent opening of valve 3b, the reagent from vat 1 and the duct 3a is similarly collected in tank 3. It is then the turn of the valve 4b to open while the valve 7b closes again; the action of pump 9 forces therefore the dyeing liquid of tank 4 into vat 1, further to which the valve 4b closes while the valve 7b opens. When the time required for colouring by the reagent of tank 4 has elapsed, the valve 4b opens and the reagent in the vat 1 and duct 4a is sent back to tank 4. The opening of the valve 5b and closing of valve 7b ensure the forcing of the rinsing water from tank 5 into vat 1 through duct 5a. After the time for rinsing has elapsed the valve 5b then closes while valve 6b opens, which makes it possible to drain the rinsing water, through the pipe 6 and into the sink. The programming device 10 then immediately actuates the motor 12 which drives the air fan 14, which makes it possible to dry the samples which have just been dyed and rinsed. The device stops automatically at the end of the working cycle, with the opening of contact 16.

Referring to FIGURE 2 it can be seen that the whole device rests on a supporting plate 17 approximately one half of which is occupied by a case 18. The parts 17 and 18 are, for example made of wood, metal or opaque plastic material. The vat 1 is in the form of a cylindrical container the side walls of which are transparent, being, for example of glass. The lower part of the vat 1 is located inside the case 18. The half 17b of the plate 17 supports the tanks 2, 3, 4 and 5, which are made of a transparent synthetic plastic material and which are respectively closed by caps or plugs 19, 20, 21 and 22 through which respectively pass glass tubes 2d and 2e, 3d and 3e, 4d and 4e, and 5d and 5e. These glass tubes are respectively connected to flexible rubber ducts constituting the ducts 2a, 2c, 3a, 3c, 4a, 4c and 5a, 5c, mentioned above, connecting the tanks 2, 3, 4 and 5 to vat 1 or to a pressurising system, of the type described in connection with FIG. 1, located inside the housing case 18.

Inside the case 18 there is also housed the programming device as well as the electrically operated valves 2b, 3b, 4b, 5b and 7b situated on the ducts 2a, 3a, 4a, 5a and 7a, respectively, as well as the valve 6b situated on the drain pipe 6 which issues from the case, as shown. FIGURE 2 also shows springs 25 of the plug 15, enabling connection of the device to be made to the supply mains. The top of the case 18 has a push button 26, the operation of which controls at least the starting of an operating cycle, and the light signal 27.

Referring to FIGURES 2 and 3, it will be seen that the vat 1 is closed by a shaped cover 28 which does not form a tight seal and which is pivotably mounted about a horizontal axis 29 carried by a foot 30 fixed to the plate forming the top of the case 18. The motor 12 driving the air fan 14 is fixed at 31 and 32 to the walls of the pivotable cover 28, orifices 33 and 34 being provided in the extreme upper face of the cover 28 to allow the passage of the air required for the drying of the samples after dyeing.

The bottom 1a of vat 1 is conical and supports legs 35 upon which rests a base 36a of a glass pillar 36 coaxially arranged inside the vat 1. The lower part of the cylindrical wall of the vat 1 is provided with a circular rubber strip 47 having spaced teeth such as 38, in two annular vertically spaced rows, providing vertical radially inwardly directed receiving slots used to achieve the bracing and spacing of the various samples which comprise glass plates P radially arranged in vertical position. One of the vertical edges of each glass plate P is in contact with the pillar 36 while the opposite edge is held between four of the teeth 38 (2 teeth each side of the plate), and the bottom edge rests at one corner on the high side of the bottom wall 1a and at its opposite corner on the ledge provided by the base flange 36a. The ducts 2a, 3a, 4a and 5a and pipe 6 do not enter the vat 1 directly, but communicate through their valves by way of respective glass tubes 2f, 3f, 4f, 5f and 6f, respectively, comprising syphon branches of a vertical glass stem tube 6c suitably attached as by fusing onto, and opening into the low point in, the conical bottom 1a of the vat 1.

FIGURE 4 shows the entire control means for the introduction into and the emptying out of the various colouring liquids, and more particularly the programing device 10 which comprises a synchronous motor 39, a reduction gear 40 and a combiner programmer proper of the cam type 41 which has a group of eight cams 42 to 49 operated cyclically by a shaft 50. These cams actuate respective switches and are adjusted or set in such a manner as to carry out automatically a specific dyeing programme. The switches themselves control the opening and the closing of the various valves 2b to 7b, with the exception of cam 49 which controls the automatic stopping at the end of the working cycle.

Provision may be made for a number of additional cams to control allied operations during the cycle, such as, for example, heating of the dyeing bath, oxygenation of the bath, and the like.

The device illustrated in FIGURES 2 to 4 has been designed to effect automatically the dyeing programme which corresponds to the determination of the leucocytic formula. This dyeing must be carried out by means of three dyes, in accordance with the following programme:

(a) Dyeing for three minutes with the pure May-Grundwald reagent;

(b) Dyeing for two minutes with May-Grundwald diluted to ½ by the addition of neutral water;

(c) Rinsing with neutral water;

(d) Colouring for fifteen minutes with Giemsa reagent diluted to 1/20 in neutral water;

(e) Rinsing with neutral water;

(f) Drying.

The shaft 50 driving the cams rotates at the rate of two revolutions per hour. Cams 42 to 49 control respectively: the drying device for the glass plates, the valve 2b controlling the passage of the pure May-Grundwald reagent, the valve 3b controlling the passage of the May-Grundwald reagent diluted to ½, the valve 6b controlling the draining of the vat contents into the sink, the valve 4b controlling the pasasge of the Giemsa reagent, the valve 5b controlling the introduction of the rinsing water into the vat 1 and the valve 7b effecting the de-pressurising of the respective tanks.

When the operating cycle begins, push-button 26 short-circuits the switch of cam 49 during the time the latter requires to close the supply circuit. At the time of the closure of the latter, light signal 27 lights up, indicating to the operator that he may relax his action on the push-button 26.

In accordance with another embodiment of the device of the invention the various tanks containing the colouring substances are situated above the level of the vat 1 and are connected through respective ducts to a collecting duct in which is arranged a suction pump, so that the colouring liquids can be extracted by suction from the vat 1 into the respective tanks. Thus the duct system is similar to that described with reference to the foregoing embodiment with the exception that the pressurising pump is replaced by a suction or vacuum pump.

In accordance with yet another embodiment of the invention, the various tanks are situated at the same level as the vat, and are connected on the one hand to a suction or vacuum pump, and on the other hand to a pressurising pump, a three-way electrically operated valve ensuring the communication of the tanks either with the vacuum pump, or with the pressurising pump. According to this embodiment, the valve putting the tanks in communication with atmospheric pressure is eliminated.

The valve effecting the communication with atmospheric pressure may comprise, in accordance with a further embodiment, a three-way electrically operated valve situated at the junction of the duct leading to the pressurising pump or to the vacuum or suction pump to the tanks and of the auxiliary duct opening freely into the atmosphere.

Although minor modifications might be suggested by those versed in the art, it should be understood that I wish to embody within the scope of the patent warranted hereon all such modifications as reasonably come within the scope of my contribution to the art.

I claim as my invention:

1. In apparatus of the character described, a vat structure comprising:

an upright container having a bottom wall and an open top, means on said bottom wall and on the inside of the container adjacent to said bottom wall for supporting specimen-carrying glass plates vertically in spaced relation;

means for introducing treating liquid into the container and for emptying the liquid;

a cover for the open top of the container;

and a fan mounted on said cover for drying the treated plates.

2. In a vat for treating specimen-carrying glass plates, and comprising an upright container having a bottom wall and an open top, means for introducing and discharging treating fluid, and a cover for the open top:

means on the bottom wall of the container comprising a central pillar, and means on the inside of the container adjacent to the bottom wall comprising an annular device provided with radially inwardly directed slots for receiving the plates vertically and with their radially inner edges opposing said pillar.

3. A vat according to claim 2, in which said slots are defined by vertically spaced annular rows of teeth minimizing contact with the plates supported thereby.

References Cited

UNITED STATES PATENTS

| | | | |
|---|---|---|---|
| 2,488,946 | 11/1949 | Turpin | 141—25 X |
| 2,558,628 | 6/1951 | Redin | 137—263 X |
| 2,634,735 | 4/1953 | Buck | 134—58 X |
| 2,966,922 | 1/1961 | Wallis | 137—263 X |
| 3,227,130 | 1/1966 | Weiskopf | 134—95 X |
| 3,294,101 | 12/1966 | Suzuki et al. | 134—95 X |
| 3,305,132 | 2/1967 | Coja | 222—76 X |

ROBERT B. REEVES, *Primary Examiner.*

HADD S. LANE, *Assistant Examiner.*